Jan. 7, 1958  H. H. CHRISTENSEN  2,819,031
HYDRAULIC POSITIONING APPARATUS
Filed Dec. 20, 1954
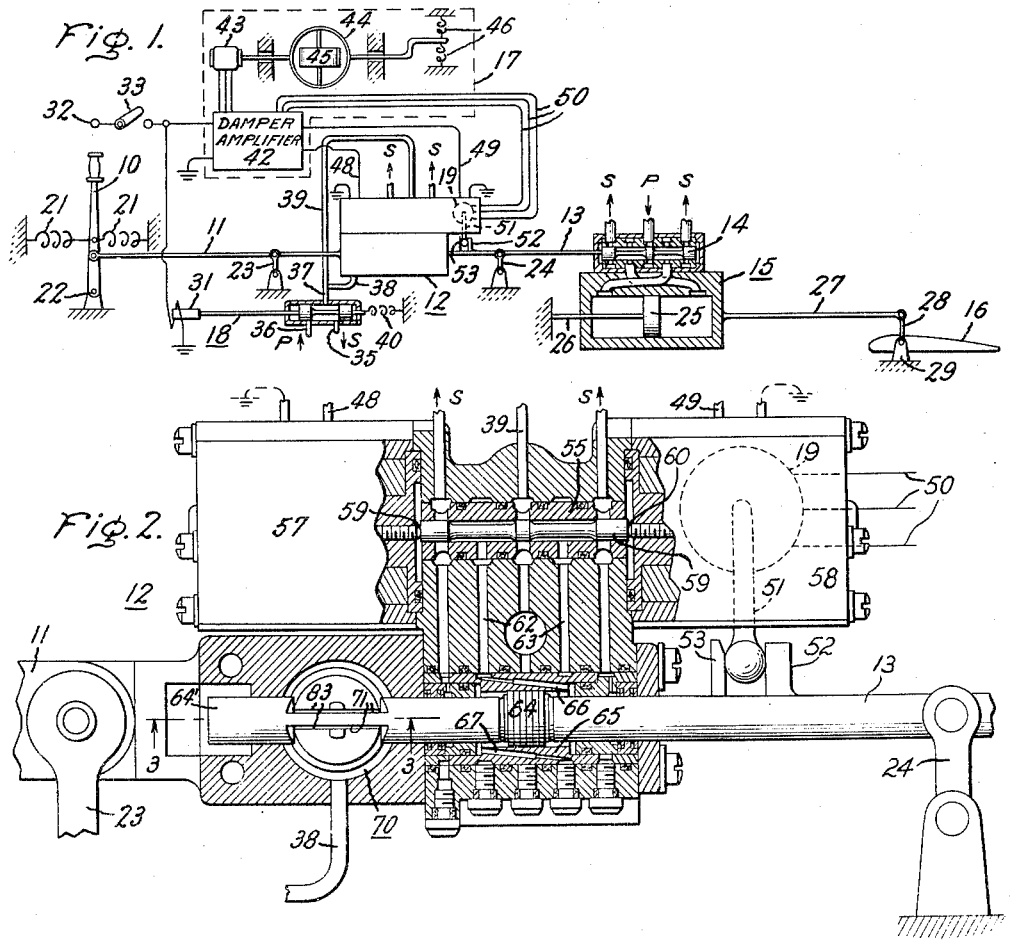
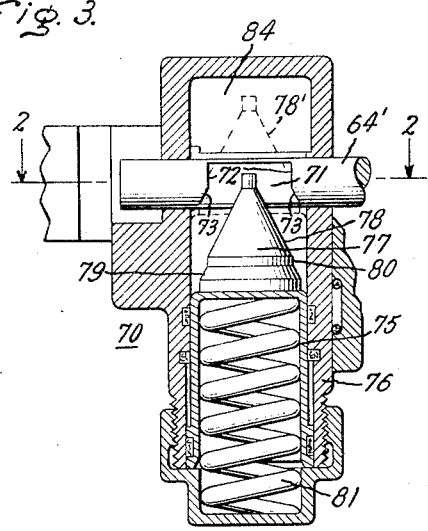
Inventor:
Horace H. Christensen,
by His Attorney.

000
United States Patent Office 2,819,031
Patented Jan. 7, 1958

2,819,031

HYDRAULIC POSITIONING APPARATUS

Horace H. Christensen, Schenectady, N. Y., assignor to General Electric Company, a corporation of New York Application December 20, 1954, Serial No. 476,257

10 Claims. (Cl. 244—78)

This invention relates to hydraulic positioning servo systems which are particularly adapted for the positioning of control surfaces of dirigible craft.

In the control of dirigible craft, and particularly in modern high-speed aircraft, automatic flight stabilization elements are often employed in the steering system rather than to attempt to design the craft so as to have inherent stability.

Accordingly, it is one object of the present invention to provide an improved hydraulic positioning servo system which is adapted for manual control, with automatic stabilization, of a dirigible craft steering system.

One of the major problems in the production of a manually operable but automatically stabilized steering system is that if the automatic stabilization apparatus is damaged, or becomes inoperative, or malfunctions for some reason, erroneous position signals may be introduced into the system, or a loss of manual control precision may result.

Accordingly, it is a further object of this invention to provide an improved hydraulic positioning servo system incorporating a centering or locking device for the elimination of undesired position signals and for the restoration of precision to the manual control through elimination of any lost motion connections resulting from inoperativeness of the automatic stabilization apparatus.

Other objects and advantages of the invention will be apparent from the following specifications and the accompanying drawings.

In carrying out the above objects of this invention in one preferred structural embodiment thereof, a hydraulic positioning motor is mechanically inserted in series in a manually positionable linkage, the output of which controls the position of a dirigible craft control surface. An electrical attitude stabilizer or damper is connected for control through a solenoid-operated pilot valve of the hydraulic positioning motor, and a spring-engaged center lock device is provided to center and lock the positioning motor in a predetermined central position. The center lock device is in the form of a hydraulic piston, and hydraulic connections are included through an electrohydraulic valve for disengaging the center lock device against the force of the engaging spring whenever both hydraulic pressure fluid and electrical power are connected to the system.

For a more complete understanding of the invention, reference should be made to the following specification and the accompanying drawings which are identified as follows:

Fig. 1 is a schematic diagram of a dirigible craft steering system incorporating the present invention.

Fig. 2 is a detail view, partially in section, of the hydraulic positioning motor which is connected in series in the manual control linkage to introduce automatic attitude stabilization or damper signals into the system of Fig. 1.

And Fig. 3 is a partial sectional bottom view of a center lock device incorporated in the positioning motor as shown in Fig. 2.

Referring more particularly to Fig. 1, there is shown a manual position signal input lever 10 from which a position signal is transmitted through a connecting rod 11, a series-connected positioning motor or servo 12, and a connecting rod 13 to the pilot valve 14 of a hydraulic servo positioning control 15. The servo 15 is connected to position a control surface 16 of a dirigible craft which is to be steered. An automatic attitude stabilizer or damper 17 is connected to control the operation of the positioning motor 12. And a solenoid-operated valve 18 is connected to disengage a spring-engaged center lock device, which forms a portion of the positioning motor 12, whenever both electrical power and hydraulic fluid under pressure are supplied to the system. A synchro 19 is provided for generating a position signal indicative of the positioning of connecting rod 13 for stabilizing the operation of the damper 17.

The operator's lever 10 is spring-centered by the springs 21 and is fixedly supported on the frame of the craft which is being controlled at the pivot 22. Pivoted supporting arms 23 and 24 are provided for the connecting rod linkage, including connecting rod elements 11 and 13 and the positioning motor 12.

For purposes of simplicity and clarity in the diagram, hydraulic conduits which are intended to be connected to a source of hydraulic pressure fluid are indicated by the letter symbol P and an ingoing arrow, and those which are intended for connection to a low pressure sump or drain are indicated by the letter symbol S and an outgoing arrow. It will be understood that a conventional pump, or other source of hydraulic pressure (not shown) may be employed.

The main power piston 25 of the servo 15 is fastened through a connecting rod 26 to the frame of the controlled craft so that the entire housing of the servo 15 moves when this servo is actuated. Motion of the housing is transmitted through a connecting rod 27 and a crank 28 to rotate the control surface 16 about a pivoted support 29.

The damper 17, and the solenoid 31 of the solenoid valve 18, are both electrically energized from a conventional source of electric current (not shown) connected at an input terminal 32 through a switch 33. Therefore, whenever the electrical energy source connected to terminal 32 is in operation and the switch 33 is closed, the damper 17 is operative and the solenoid 31 shifts the solenoid valve to the left in the diagram. This shift of valve 18 disconnects the sump conduit 35 and connects the pressure conduit 36 to a hydraulic pressure supply line 37. Line 37 includes a branch 38 for disconnecting a center lock device which will be more fully described below in connection with Figs. 2 and 3, and a branch 39, which is the liquid pressure supply to the solenoid-actuated pilot valve of the positioning motor 12. If the switch 33 is opened, or if for some other reason electric power to the solenoid 31 is interrupted, the solenoid valve 18 will return to the position shown under the force of a spring 40 to disconnect the source of hydraulic fluid pressure at 36 and to reconnect the low pressure sump at 35.

The damper 17 includes a damper amplifier 42 which may be of conventional construction and is arranged to receive a signal indicative of transient changes in the attitude of the craft to be controlled from a synchro 43 which is connected for rotation by a rate gyro 44. Gyro 44 may be of conventional construction, including a rotor 45 and spring such as schematically indicated at 46 for yieldably restraining the gyro gimbal rotation. Conventional apparatus (not shown) is provided for continuously rotating the gyro rotor 45. Upon the occurrence of a transient change in the attitude of the craft which is controlled, a corresponding signal is transmitted from the gyro 44 through the synchro 43 to the damper amplifier 42. The amplifier signal is then transmitted from the amplifier 42 through connections 48 and 49 to solenoids within the servo 12 to provide a stabilization signal at the linkage 13. As mentioned above, the damper 17 is stabilized by an electric position signal provided by the synchro 19 indicative of the position of connecting rod 13. The signal from synchro 19 is transmitted through lines 50 to the damper amplifier 42. The synchro 19 is preferably supported on the back of the housing of the positioning motor 12, and the position signal is derived through a crank arm 51 which is held in mechanical engagement with a protrusion 52 on the output linkage from the motor 12 by a leaf spring member 53.

Fig. 2 is an enlarged detail view, partially in section, of the motor 12 of Fig. 1. In this positioning motor or servo control device, a pilot valve 55 is provided having a pilot valve piston 56 which is of conventional three-land construction. Pilot valve positioning solenoids 57 and 58 are provided having armatures which bear against the respective ends of the pilot valve piston 56 as indicated at 59 and 60. The armatures of the solenoids 57 and 58 are preferably spring-mounted so as to automatically center the pilot piston 56, under the spring forces, as shown. These solenoids are preferably constructed in accordance with the teachings of Patent 2,435,817—Boynton, which is assigned to the same assignee as the present application.

The center land of the pilot piston 56 controls the connection of hydraulic pressure fluid from the conduit 39 alternatively to either one of the control passages 62 or 63 whenever pilot piston 56 is displaced in either direction from the central null position. From the passages 62 or 63, the hydraulic fluid is conveyed to one side or the other of the power piston 64. The cylinder sleeve 65 in which the power piston 64 is mounted contains diagonal passages 66 and 67, which respectively complete connections from the liquid passage 62 to the right end of power piston 64 and from passage 63 to the left end of power piston 64. Passages 66 and 67 therefore provide a reversal of the hydraulic connections which would usually obtain with the configuration shown. This reversal of connections provides for stability of operation of the servo 12 where sudden mechanical agitation or movement of the housing of the servo might otherwise cause unstable operation. For instance, if the entire housing of the servo is suddenly moved to the right, such as by movement of the connecting rod 11, the pilot valve piston 56, which is centered by the springs of the solenoids 57 and 58, tends to remain in the original position due to inertia. This pilot piston 56 is thus effectively shifted to the left in its relative position within the cylinder to connect high pressure hydraulic fluid from the conduit 39 to the passage 63, from whence it is conveyed through the diagonal passage 67 to the left side of the power piston 64. The resulting movement of the power piston 64 within the housing to the right would tend to move the housing of the servo 12 back to the left in opposition to the reaction forces of the apparatus connected to the right of the piston 64. This leftward force on the housing tends to re-center the pilot piston 56 so that the chain of events arising from the original mechanical disturbance of the housing is interrupted. It is apparent that if the reversal of connections provided by the passages 66 and 67 is not accomplished, then the chain of events would not be broken and the disturbance would result in unstable oscillation of this portion of the system.

As mentioned above in connection with the description of Fig. 1, the servo 12 incorporates a center-lock device which is generally indicated at 70. For an understanding of this portion of the structure, reference should be made to Fig. 3 as well as Fig. 2. Fig. 3 is a partial sectional view through the section indicated at 3—3 in Fig. 2. The section shown in Fig. 2 is similarily indicated by the section line 2—2 in Fig. 3. The power piston 64 includes an integral shaft 64'. In the center lock device 70, a portion of the shaft 64' is slotted on opposite sides as indicated at 71. The edges of slots 71 include transverse portions 72 in planes generally perpendicular to the axis of the shaft 64' as well as slanted or tapered portions 73. A hydraulic piston or plunger 75 is provided which is supported within a suitable cylinder enclosure 76. Piston 75 includes a wedge-shaped tip 77 having tapered portions at 78 and 79 corresponding to the taper of portions 73 of the slots 71. It will be understood that these tapered portions 78 and 79 may be conical in shape as indicated in the drawing. However, it is necessary only that the edges be tapered where engagement with the tapered portions 73 of the slots 71 takes place as described immediately below. The tip 77 also includes a straight or cylindrical portion 80 intermediate the tapered portions 78 and 79, which corresponds in maximum width to the distance between the opposite straight edges 72 of the slots 71. A powerful compression spring 81 is provided to bias the piston 75 in an upward direction, as viewed in Fig. 3, into a centerlock position as indicated by the dotted outline of the tip 77 indicated at 78'. As the piston 75 is forced into this locked position by the spring 81, if the power piston and the piston shaft 64' are not in the centered position as shown in the drawing, one of the tapered surfaces 78 of the piston tip 77 engages with a corresponding tapered surface 73 of the slots 71 to force the shaft 64' into the centered position. When the centered position is achieved, further travel of the piston 75 causes an insertion of the straight or cylindrical portion 80 of the piston tip 77 into the straight portion 72 of the slots 71. The engagement of these straight portions between the piston and shaft provides a very positive locking engagement which will transmit very high forces without loss of the centered position, with the exception of the small amount of lost motion which is necessarily present due to the fitted clearances between these parts. However, in this position of the piston, the spring 81 forces the tapered portions 79 of the piston tip 77 into engagement with the tapered portions 73 of the slots 71. Therefore, unless uncentering forces on shaft 64' exceed the force exerted by spring 81 through this tapered fit, there is no lost motion in the center locking action of the piston 75.

As indicated at 83 in Fig. 2, the tip 77 of piston 75 includes a center slot which permits the two sides of the tip 77 to straddle the portion of the shaft 64' reduced by the slots 71. Both sides of the tip 77 are effective in the center-locking action described above. The effective edges of wedge portions 78, 79 and 80 which engage the shaft slot portions 72 and 73 may preferably be ground in planes perpendicular to the plane of the drawing to provide surface contact with slot portions 72 and 73.

As briefly mentioned in connection with Fig. 1, when hydraulic pressure is applied to the conduit branch 38, the center-lock device 70 is disengaged. This is accomplished because the conduit 38 is connected to the upper end of the cylinder enclosure 76 as shown in Fig. 2. The upper end of the enclosure at 84 is thus filled with hydraulic liquid under pressure sufficient to force the piston 75 downwardly against the force of spring 81 into the unlocked position as shown in Fig. 3. In this unlocked position, sufficient clearance space exists between the tip 77 and the edges of the slots 71 to permit the maximum desired travel of the power piston 64.

It will be seen from the above description that in the operation of the system shown in Fig. 1, if the switch 33 is opened or if electrical power becomes unavailable to the system for any other reason, the solenoid valve 18 will move to the de-energized position as shown, to disconnect the source of hydraulic fluid pressure from the center-lock device 70 and from the pilot valve 55, so that hydraulic pressure will be removed from the power piston 64 and the center-lock piston 75 will be free to move to the center locked position. The remainder of the system is then capable of normal manual operation of the pilot valve 14 of the hydraulic servo 15 by the operator's lever 10, without the benefit of the stabilization which is normally desired from the damper 17. Thus, the presence of any otherwise troublesome lost motion or extension or contraction of the linkage due to lack of proper control of the power piston 64 is avoided. A similar result is achieved if the source of hydraulic fluid pressure is disconnected from the inlet to solenoid valve 18.

Although the system of this invention has been described entirely by reference to a "pitch" control, it will be understood that corresponding systems would be normally employed by control of "yaw" and "roll" motions of an aircraft.

Also, although in the system described the manual and automatic position signals were mixed by insertion of the electromagnetically-controlled servo 12 in series in the manual linkage, it will be understood that this servo may be fixed to the frame of the controlled craft, and the signals may be mixed through a lever system.

The following claims are intended to define the valid scope of this invention over the prior art and to cover all changes and modifications falling within the true spirit and valid scope of the invention.

What I claim as new and desire to secure by Letters Patent of the United States is:

1. An electrically-operated hydraulic positioning servo comprising a pilot valve, a control circuit having an electrical power supply and including solenoid means connected to said pilot valve for movement thereof responsive to positioning signals supplied said circuit, a hydraulic positioning motor including a piston and cylinder connected for operation in response to movement of said pilot valve, spring actuated hydraulically restrained center-lock means connected to center and lock said piston with respect to said cylinder upon loss of hydraulic pressure, and solenoid actuated valve means energized by said electrical power supply and operative upon failure thereof to cut off hydraulic pressure to said center-lock means for rendering said center-lock effective.

2. An electrically-operated hydraulic positioning servo comprising a solenoid positioned pilot valve, electric signal generating apparatus connected to the solenoids of said pilot valve, a hydraulic positioning motor including a piston and cylinder connected for operation in response to movement of said pilot valve, a center-lock device connected to center and lock said piston with respect to said cylinder upon loss of hydraulic pressure, and a solenoid-operated valve energized from a source common to said signal apparatus connected to interrupt the supply of hydraulic pressure fluid to said center-lock device for rendering center-lock effective upon loss of electrical power from said common energy source.

3. A center-lock device for centering and locking reciprocable apparatus comprising a reciprocable member for connection to the device to be centered and locked, a second reciprocable member movable transversely with respect to said first member between locked and unlocked positions, said members including surfaces mutually engageable as said second member is advanced from the unlocked to the locked position, with at least one of said mutually engageable surfaces including a first tapered portion for gradual centering of said first member as said second member is advanced from the unlocked to the locked position, with both said mutually engageable surfaces including untapered portions dimensioned for close engagement in the locked position of said second member, and with at least one of said mutually engageable surfaces including a second tapered portion for precise centering of said first member when said second member is in locked position, spring means for biasing said second member into one position and means operable to bias said member into the other position in opposition to said spring means.

4. A center-lock apparatus for centering and locking a movable device in a predetermined centered position comprising a reciprocable operating shaft for connection to the device to be centered, said shaft including a transverse slot therein, a piston having a wedge-shaped end movable into said slot upon movement of said piston from a first position to a second position, spring means for biasing said piston into one of said positions and hydraulic pressure responsive means for overcoming said spring and biasing said piston into the other of said positions, said wedge-shaped end including a first tapered portion arranged for the insertion of progressively wider portions thereof into said slot as said piston is advanced into said second position, at least a portion of said slot including non-tapered walls and at least a portion of said wedge-shaped end having non-tapered walls dimensioned for closely fitting relationship therewith in said second piston position, said wedge-shaped end further including a second tapered portion arranged for engagement with walls of said slot for precise centering of said reciprocable operating shaft when said locking piston is in its said second position.

5. A combined centering and locking device for reciprocable apparatus comprising a reciprocable shaft for connection to the apparatus to be centered and locked, said shaft including oppositely disposed slots therein forming a reduced section thereof, a wedge-shaped plunger having a center slot adapted to accommodate said reduced section of said shaft, said plunger being arranged for movement transverse to the axis of said shaft for the insertion of progressively wider portions thereof into said shaft slots, the widest portions of said shaft slots being dimensioned to fit with the widest portions of said plunger to provide a centered and locked position of said shaft upon maximum movement of said plunger, a compression spring in engagement with said plunger for bias thereof into said locked position, a cylinder enclosure for supporting and enclosing said plunger, and hydraulic connections for said enclosure for retraction of said plunger against the force of said spring upon the introduction of hydraulic pressure fluid thereto.

6. A pilot valve controlled hydraulic positioning motor comprising a power piston including an integral shaft reciprocably positionable therewith, a pilot valve connected to control the position of said piston, said pilot valve including a connection for reception of hydraulic pressure fluid for the control of said piston, said piston shaft including oppositely disposed transverse slots therein defining a reduced section thereof, a plunger having wedge-shaped portions straddling said reduced section and arranged for insertion of progressively wider portions of said wedge-shaped portions into said slots as said plunger is advanced from an unlocked to a locked position, the maximum dimensions of said wedge-shaped portions fitting with the maximum dimensions of said slots to provide close engagement therebetween in the locked position of said plunger, a spring for biasing said plunger into said locked position, a cylinder enclosure for supporting said plunger for reciprocable movement thereof, said enclosure including a connection with said pilot valve hydraulic fluid connection to bias said plunger against the force of said spring into said unlocked position.

7. An electro-hydraulic servo system comprising a housing, a hydraulic power piston mounted for reciprocable positioning movement in a cylindrical cavity within said housing, a pilot piston reciprocably mounted within said housing, said housing including hydraulic liquid passages from said pilot piston to control movement of said power piston in response to displacement of said pilot piston away from a central null position, electromagnetic solenoids arranged at the ends of said pilot piston for positioning thereof in response to electrical signals, signal generating apparatus connected to supply said solenoids, an electric power circuit connected to supply power to said signal generating apparatus, said power piston including an integral shaft reciprocable therewith, said shaft including oppositely disposed transverse slots forming a reduced section therein, a spring-biased centering and locking plunger having two wedge-shaped portions arranged to straddle said reduced section and to progressively fill said shaft slots upon advancement of said plunger transversely to said shaft from an unlocked position to a locked position, said housing including a chamber for enclosing and supporting said plunger, hydraulic connections to said chamber for the admission of hydraulic pressure liquid to force said plunger into said unlocked position, a solenoid-operated hydraulic valve arranged for connection to a source of hydraulic pressure liquid and including energizing connections to said electric power circuit, and connections from said solenoid valve to supply hydraulic pressure liquid to said pilot piston and to said plunger chamber connections upon electrical energization thereof.

8. A hydraulic steering system for a dirigible craft comprising an electro-hydraulically operated positioning motor adapted to receive a manual position signal and to transmit a combination of said manual signal and a position signal introduced by said positioning motor, a pilot valve connected to control the operation of said positioning motor, electromagnetic solenoids arranged for positioning said pilot valve, an electrical attitude stabilization device connected to energize said solenoids, a source of electric power for energizing said stabilization device, hydraulic positioning apparatus connected for operation in response to said combination of signals from said positioning motor for positioning a control surface of the dirigible craft to be steered, a center-lock device for said positioning motor comprising a piston having a wedge-shaped tip, said positioning motor having an integral shaft including a transverse slot therein for reception of said wedge-shaped tip, a spring for biasing said wedge-shaped tip into said slot to center and lock said shaft, a cylinder enclosure surrounding and supporting said piston, connections for hydraulically pressurizing said cylinder enclosure for biasing said piston into the unlocked position, said connections including a solenoid valve connected for energization from said source of electric power, said solenoid valve being operable upon interruption of said electric power connections to interrupt said hydraulic pressure connections to release said center-lock device for operation thereof.

9. A combined manual and automatic steering control system for a dirigible craft comprising a housing, a manual steering control for positioning said housing, a hydraulic power piston mounted for reciprocable positioning movement in a cylindrical cavity within said housing, a pilot piston reciprocably mounted within said housing, said housing including hydraulic liquid passages from said pilot piston to control movement of said power piston in response to displacement of said pilot piston away from a central null position, electromagnetic solenoids arranged at the ends of said pilot piston for positioning thereof in response to electrical signals, steering stabilization signal generating apparatus connected to supply said solenoids, an electric power circuit connected to supply power to said signal generating apparatus, said power piston including an integral shaft reciprocable therewith, a separate pilot operated hydraulic servo-positioning system connected for operation by the combined manual and stabilization signals from said shaft for positioning a steering control surface, said shaft including opositely disposed transverse slots forming a reduced section therein, a spring-biased centering and locking plunger having two wedge-shaped portions arranged to straddle said reduced section and to progressively fill said shaft slots upon advancement of said plunger transversely to said shaft from an unlocked position to a locked position, said housing including a chamber for enclosing and supporting said plunger, hydraulic connections to said chamber for the admission of hydraulic pressure liquid to force said plunger into said unlocked position, a solenoid-operated hydraulic valve arranged for connection to a source of hydraulic pressure liquid and including energizing connections to said electric power circuit, and connections from said solenoid valve to supply hydraulic pressure liquid to said pilot piston and to said plunger chamber connections upon electrical energization thereof.

10. A hydraulic positioning servo system comprising a pilot valve, a hydraulic positioning motor including piston and cylinder members connected for operation in response to movement of said pilot valve, and a spring actuated hydraulically restrained combined centering and locking device containing a slotted locking portion and connected to react with one of said positioning motor members for moving said one member to a centered position with respect to the other of said members and locking said one member in such center position upon loss of hydraulic pressure to the servo system.

References Cited in the file of this patent
UNITED STATES PATENTS

| | | |
|---|---|---|
| 1,962,677 | Dickey | June 12, 1934 |
| 2,139,185 | Engel | Dec. 6, 1938 |
| 2,314,444 | Crittenden | Mar. 23, 1943 |
| 2,585,837 | Randol | Feb. 12, 1952 |
| 2,678,177 | Chenery et al. | May 11, 1954 |
| 2,705,940 | Edwards | Apr. 12, 1955 |